United States Patent
Nogi et al.

(10) Patent No.: US 12,170,499 B2
(45) Date of Patent: Dec. 17, 2024

(54) MOTOR DRIVE APPARATUS

(71) Applicant: Carrier Japan Corporation, Tokyo (JP)

(72) Inventors: Masaya Nogi, Fuji (JP); Masayuki Yoshimura, Fuji (JP)

(73) Assignee: Carrier Japan Corporation, Tokyo (JP)

( * ) Notice: Subject to any disclaimer, the term of this patent is extended or adjusted under 35 U.S.C. 154(b) by 80 days.

(21) Appl. No.: 18/105,501

(22) Filed: Feb. 3, 2023

(65) Prior Publication Data

US 2023/0188076 A1 Jun. 15, 2023

Related U.S. Application Data

(63) Continuation of application No. PCT/JP2020/030085, filed on Aug. 5, 2020.

(51) Int. Cl.
*H02P 27/08* (2006.01)
*H02M 7/5395* (2006.01)
*H02P 6/20* (2016.01)
*H02P 7/06* (2006.01)

(52) U.S. Cl.
CPC .......... *H02P 27/08* (2013.01); *H02M 7/5395* (2013.01); *H02P 6/20* (2013.01); *H02P 7/06* (2013.01); *H02P 2207/05* (2013.01)

(58) Field of Classification Search
CPC .... H02P 27/08; H02P 6/20; H02P 7/06; H02P 2207/05; H02P 6/21; H02P 29/50; H02M 7/5395
USPC .......................... 318/811, 810, 807, 767, 727
See application file for complete search history.

(56) References Cited

U.S. PATENT DOCUMENTS

| | | | |
|---|---|---|---|
| 9,590,551 B2 * | 3/2017 | Omata | H02P 21/26 |
| 2018/0026567 A1 | 1/2018 | El Khamlichi Drissi et al. | |

FOREIGN PATENT DOCUMENTS

| | | |
|---|---|---|
| JP | 4906836 B | 1/2012 |
| JP | 2015139341 A | 7/2015 |
| JP | 2016073097 A | 5/2016 |
| JP | 2018506253 A | 3/2018 |
| JP | 2019176554 A | 10/2019 |

OTHER PUBLICATIONS

PCT Search Report and Written Opinion mailed on Oct. 13, 2020 for PCT Application No. PCT/JP2020/030085, 10 pages.
Extended European Search Report mailed on Apr. 5, 2024, for European U.S. Appl. No. 18/105,501, a foreign counter part of U.S. Appl. No. 18/105,501, 8 pages.

* cited by examiner

*Primary Examiner* — David Luo
(74) *Attorney, Agent, or Firm* — Lee & Hayes, P.C.

(57) ABSTRACT

According to one embodiment, a motor drive apparatus includes a first inverter, a second inverter, and a controller. This controller rotationally moves, at the time of startup of a motor, a rotor of the motor to an initial position by DC excitation of supplying DC exciting currents from the first and second inverters to the phase windings of the motor and, after this rotational movement, PWM-controls switching of the first and second inverters in such a manner that a rotational speed of the rotor becomes a target rotational speed. Then, the controller carries out the DC excitation fey which a zero-axis current in each of the phase windings becomes approximately zero.

7 Claims, 4 Drawing Sheets

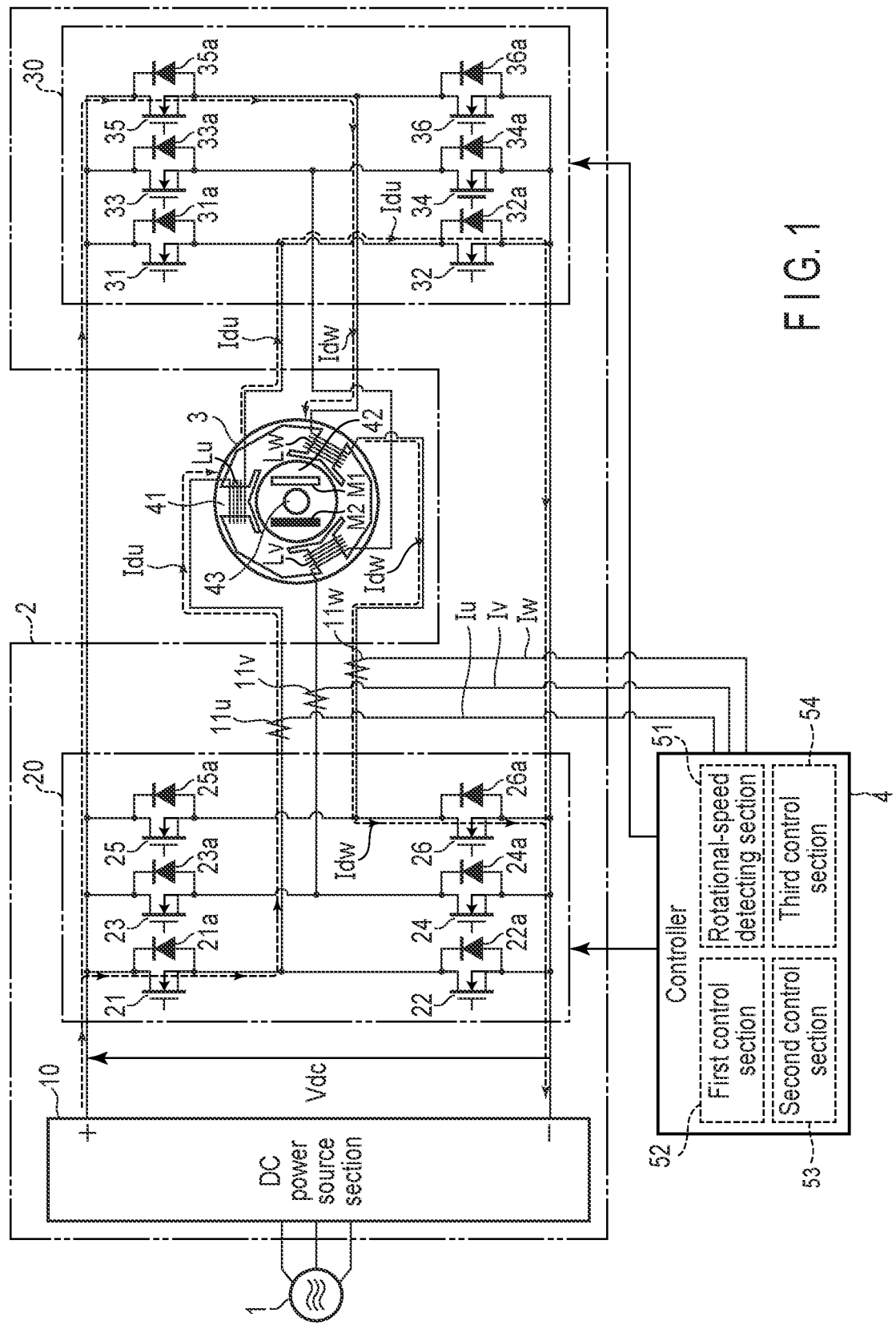
F I G. 1

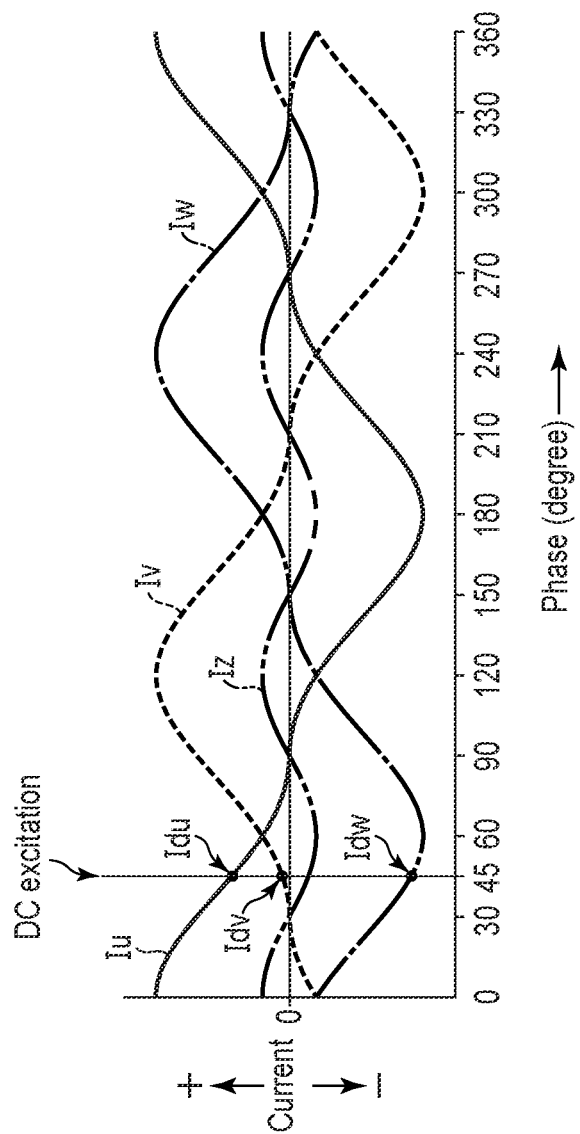
F I G. 4

MOTOR DRIVE APPARATUS

CROSS-REFERENCE TO RELATED APPLICATION'S

This application is a Continuation Application of PCT Application No. PCT/JP2020/030085, filed Aug. 5, 2020, the entire contents of which are incorporated herein by reference.

FIELD

Embodiments described herein relate generally to a motor drive apparatus configured to drive a motor, including a plurality of phase windings in a mutually unconnected state.

BACKGROUND

As a motor configured to drive a compressor or the like, a permanent magnet synchronous motor (also referred to as a DC brushless motor) including a plurality of phase windings is used. Further, the motor used to drive the compressor is built in the compressor. The inside of the compressor is subjected to high temperature and high pressure, and hence a sensor configured to detect the rotational position of the motor, i.e., the rotor rotational position cannot be incorporated in the compressor. For this reason, a motor of this kind is configured to employ sensor-less drive of estimating the rotor rotational position from the motor winding current responding to the output of the inverter. Further, as an example of the permanent magnet synchronous motor, an open-winding motor including a plurality of phase windings in a mutually unconnected state is known.

A motor drive apparatus configured to drive the open-winding motor (abbreviated as a motor) includes a first inverter configured to control electrification to one end of each phase winding of the motor, and second inverter configured to control electrification to the other one of each phase winding of the motor, and drives the motor by switching of these first and second inverters. In particular, at the time of startup of the motor, initial positioning of rotationally moving the rotor of the motor to a predetermined initial rotational position to thereby fix the rotor at the initial rotational position by so-called direct-current (DC) excitation of making DC exciting currents flow from the first and second inverters to the phase windings through, predetermined pathways is carried out. After this positioning, forced commutation of supplying field-component currents from the first and second inverters to the phase windings is carried out, and thus the startup is completed. Further, after the completion of the startup, currents flowing through the windings are detected, rotational speed of the rotor and rotor rotational position are detected or estimated on the basis of the detected currents, and switching of the first and second inverters is PWM-controlled in such a manner that the rotational speed of the rotor becomes the target rotational speed.

As a problem peculiar to the case where the open winding-motor is driven, a zero-axis current that does not contribute to drive of the motor flows concomitantly with electrification to the motor. There is a problem that at the time of initial positioning of startup, concomitantly with flowing of the DC exciting currents through the phase windings, the zero-axis current increases to thereby increase the motor loss.

An embodiment described herein arras to provide a motor drive apparatus capable of reducing motor loss at the time of startup of a motor.

BRIEF DESCRIPTION OF THE DRAWINGS

FIG. 1 is a block diagram showing the configuration of an embodiment.

FIG. 4 is a view showing another example of phases of DC excitation in the embodiment.

DETAILED DESCRIPTION

Figure 2:
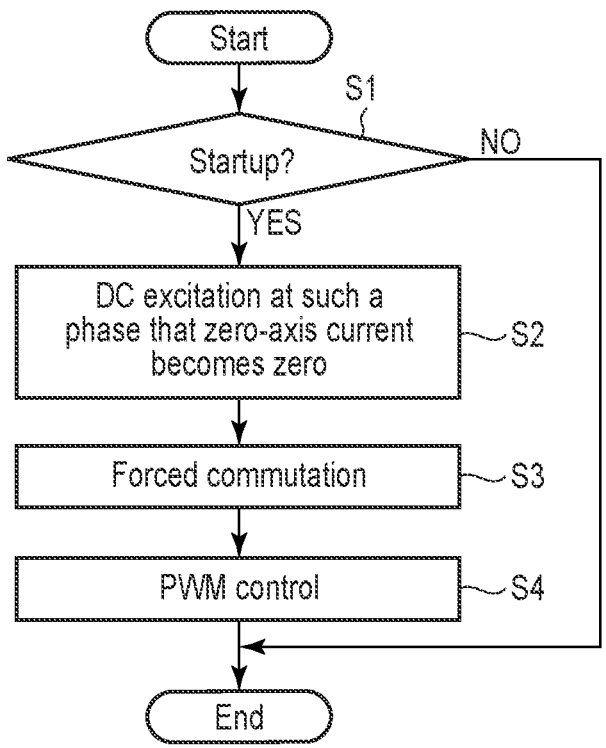
FIG. 2 is a flowchart shewing control of a controller in the embodiment.

Hereinafter a motor drive apparatus of an embodiment will be described with reference to the accompanying drawings.

In general, according to one embodiment, a motor drive apparatus of claim 1 is an apparatus configured to drive a motor including a plurality of phase windings arranged in a mutually unconnected state, and includes a first inverter configured to control electrification to one end of each of the phase windings, a second inverter configured to control electrification to the other end of each of the phase windings, and a controller configured to, at the time of startup of the motor, rotationally move a rotor of the motor to an initial position by DC excitation of supplying DC exciting currents from the first and second inverters to the phase windings and, after this rotational movement, PWM-control switching of the first and second inverters in such a manner that a rotational speed of the rotor becomes the target rotational speed. Then, the controller carries out the DC excitation by which a zero-axis current in each of the phase windings becomes approximately zero.

As shown in FIG. 1, a drive circuit 2 is connected to a three-phase AC power source 1, and motor 3 and controller 4 are connected to the drive circuit 2.

The motor 3 is a three-phase permanent magnet synchronous motor configured to drive a compressor and including a plurality of phase windings Lu, Lv, and Lw which are in a mutually unconnected state, i.e., a so called open-winding motor, and includes a stator 41 provided with the phase windings Lu, Lv, and Lw, rotor 42 including a plurality of, for example, two permanent magnets M1 and M2 embedded therein, and rotor shaft 43 configured to support the rotor 42 thereon.

The aforementioned drive circuit 2 includes a DC power source section 30 configured to subject three-phase AC voltages of the three-phase AC power source 1 to full-wave rectification, smooth the rectified voltage, and output the smoothed voltage, inverter (first inverter) 20 configured to control electrification of portions between the output end of the DC power source 10 and one ends of the phase windings Lu, Lv, and Lw of the open-winding motor 3, and inverter (second inverter) 30 configured to control electrification of portions between the output end of the DC power source apparatus 10 and the other ends of the phase windings Lu, Lv, and Lw of the open-winding motor 3. A power-source-commonized system in which the DC power source apparatus 10 is made the DC power source common to the inverters 20 and 30 is employed.

The inverter 20 includes, a series circuit of, for example, IGBTs 21 and 22, series circuit of IGBTs 23 and 24, and series circuit of IGBTs 25 and 26, and controls electrification of a portion between an interconnection point of the IGBTs 21 and 22 and one end of the phase winding Lu, electrification of a portion between an interconnection point of the IGBTs 23 and 24 and one end of the phase winding Lv, and electrification of a portion between an interconnection point of the IGBTs 25 end 26 and one end of the phase winding Lw by switching (on/off) of the IGBTs 21 to 26. Regeneration diodes (also referred to as freewheel diodes) 21a to 26a are connected in inverse parallel with the IGBTs 21 to 26.

The inverter 33 includes, as in the case of the inverter 20, a series circuit of, for example, IGBTs 31 and 32, series circuit of IGBTs 33 and 34, and series circuit of IGBTs 35 and 36, and controls electrification of a portion between an interconnection point of the IGBTs 31 and 32 and the other end of the phase winding Lu, electrification of a portion between an interconnection point of the IGBTs 33 and 34 and the other end of the phase winding Lv, and electrification of a portion between an interconnection point of the IGBTs 35 and 36 and the other end of the phase winding Lw by switching (on/off) of the IGBTs 31 to 36. Regeneration diodes 31a to 36a are connected in inverse parallel with the IGBTs 31 to 36.

It should be noted that the inverter 20 is actually a module in which a main circuit formed by connecting the aforementioned three series circuits in parallel with each other, and peripheral circuits such as a drive circuit and the like configured to drive the IGBTs 21 to 26 of the main circuit are accommodated in a single package, i.e., a so-called intelligent power module (IPM). The inverter 30 is also an IPM of the same configuration.

Current sensors 11u, 11v, and 11w are arranged on the three electrification lines between the inverter 20 and one ends of the phase windings Lu, Lv, and Lw. These current sensors 11u, 11v, and 11w detect phase currents Iu, Iv, and Iw flowing through the phase windings Lu, Lv, and Lw. Sensing signals of these current sensors 11u, 11v, and 11w are transmitted to the controller 4.

The controller 4 is constituted of a microcomputer and peripheral circuits thereof, is a unit configured to subject motor drive to be carried out by the drive circuit 2 to sensor-less vector control, and includes a rotational-speed detecting apparatus 51, first control apparatus 52, second control apparatus 53, and third control apparatus 54.

The rotational speed detecting apparatus 51 detects (estimates) the rotational speed (angular speed) of the rotor 42 of the motor 3 on the basis of the phase currents Iu, Iv, and Iw to be detected by the current sensors 11u, 11v, and 11w.

At the time of startup of the motor 3, the first control apparatus 52 carries out initial positioning of rotationally moving the rotor 42 of the motor 3 to a predetermined initial position (predetermined mechanical rotation angle) oy DC excitation of supplying DC exciting currents Idu, Idv, and Idw from the inverters 20 and 30 to the phase windings Lu, Lv, and Lw through predetermined pathways. At the time of the startup of the motor 3, in particular, the first control apparatus 52 carries out DC excitation by which a zero-axis current (also referred to as a zero-phase current) Iz in each of the phase windings Lu, Lv, and Lw becomes approximately zero. The DC exciting currents Idu, Idv, and Idw to be used to carry cut this DC excitation correspond to, among combinations of phase currents Iu, Iv, and Iw mode to flew through the phase windings Lu, Lv, and Lw by the to-be-hereinafter-described PWM control, to be carried out by the second control apparatus 53, particularly the phase currents Iu, Iv, and Iw of a phase at which the zero-axis current Iz in each of the phase windings Lu, Lv, and Lw becomes approximately zero. The phase currents Iu, Iv, and Iw of a phase at which the zero-axis currents Iz become approximately zero imply the phase currents Iu, Iv, and Iw of a phase at which one of the phase currents becomes zero and remaining two phase currents have values approximately equal to each other on the positive side and on the negative side. An electrical angle of the phase at which one of the phase currents becomes zero and remaining two phase currents have values equal to each other on the positive side and on the negative side is, when the electrical angle at which one of the phase currents is maximized is assumed to be 0° serving as the reference, 30°, 90°, 150°, 210°, 270° or 330°. Hereinafter notation of the phase implies an electrical angle using the above-mentioned criterion.

After the rotor 42 is rotationally moved to initial position by the aforementioned DC excitation, the second control apparatus 53 rotates the rotor 42 of the motor 3 by forced commutation of supplying field-component currents (d-axis currents) from the inverters 20 and 30 to the phase windings Lu, Lv, and Lw to thereby complete the startup of the motor 3.

After completion of the startup of the motor 3 by the forced commutation, the third control, apparatus 54 PWM (pulse width modulation)-controls switching of the inverters 20 and 30 in such a manner that the rotational speed of the rotor 42 to be detected by the rotational speed detecting apparatus 51 becomes a target rotational speed to be specified from outside.

The control to be executed by the controller 4 is shown in the flowchart of FIG. 2. Steps S1, S2 . . . in the flowchart are abbreviated simply as S1, S2 . . . .

At the time of the startup of the motor 3 (YES of S1), the controller 4 carries out DC excitation at such a phase that the zero-axis current Iz in each of the phase windings Lu, Lv, and Lw becomes approximately zero in order to rotationally move the rotor 42 of the motor 3 to the predetermined initial position in advance (32). That is, the controller 4 controls switching of the inverters 20 and 30 in such a manner that no DC exciting current flows through one phase winding, DC exciting current in one direction flows through another phase winding, and DC exciting current in the other direction flows through a remaining phase winding.

After the rotational movement of the rotor 42 to the initial position effected by the DC excitation, the controller 4 rotates the rotor 42 of the motor 3 by the forced commutation (S3) of supplying field component currents from the inverters 20 and 30 to the phase windings Lu, Lv, and Lw to thereby complete the startup of the motor 3. After completion of the startup, the controller 4 PWM (pulse width modulation)-controls switching of the inverters 20 and 30 in such a manner that the rotational speed of the rotor 42 to be detected by the rotational speed detecting apparatus 51 becomes the target rotational speed (S4).

Figure 3:
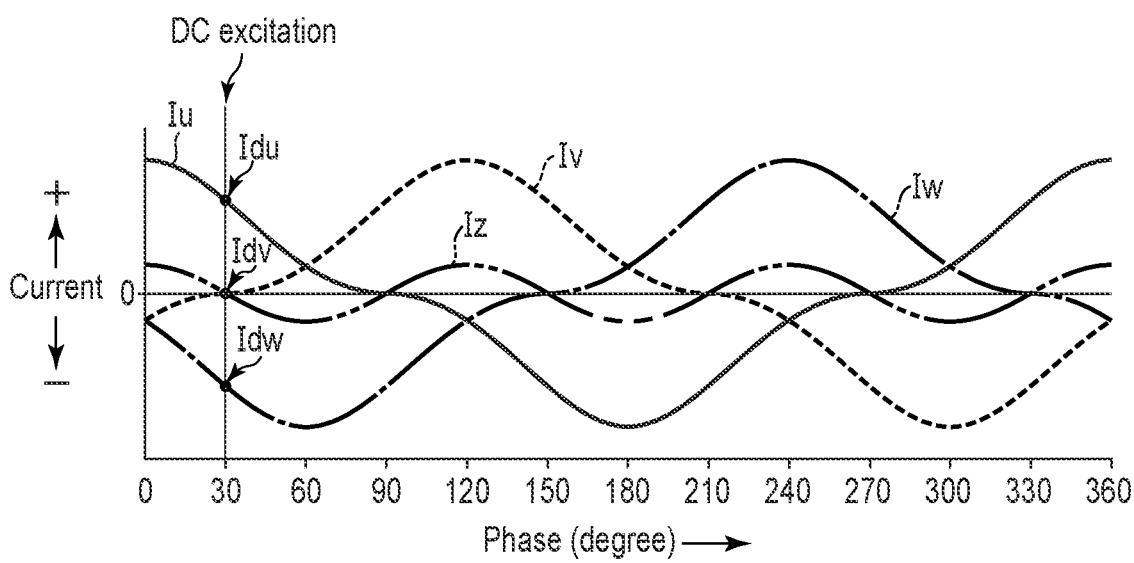
FIG. 3 is a view showing phases of DC excitation in the embodiment.

The phase currents Iu, Iv, and Iw made to flow through the phase windings Lu, Lv, and Lw by the PWM control during the operation change in such a manner as to be out of phase with each other by 120° as shown in FIG. 3. The solid line indicates the phase current Iu, broken line indicates the phase current Iv, dashed-dotted line indicates the phase current Iw, and dashed-two dotted line indicates the zero-axis current Iz. In FIG. 3, the electrical angle at the time when the phase current Iu of the U-phase is maximized is expressed as 0° serving as the reference. The zero-axis current Iz changes in a sinusoidal form with a period three times each of the phase currents, and includes six zero-crossing points within the range of one period of each of the phase currents. The phase of each of these zero-crossing points is 30°, 90°, 150°, 210°, 270° or 330°. At each of these phases, an electrification pattern in which one phase current becomes zero and remaining two phase currents have values equal to each other on the positive side and on the negative side is formed. That is, switch elements of the inverters 20 and 30 connected to one phase winding are turned off, one switch element on the upper side of the inverter 20 connected to another phase winding is turned on, one switch element on the lower side of the inverter 30 is turned on, one switch element on the upper side of the inverter 30 connected to the remaining one phase winding is turned on, and one switch element on the lower side of the inverter 20 is turned on.

The DC exciting currents Idu, Idv, and Idw for DC excitation correspond to, among combinations of phase currents Iu, Iv, and Iw flowing through the phase windings Lu, Lv, and Lw, particularly the phase currents Iu, Iv, and Iw of a phase at which one phase-current becomes zero, and remaining two phase currents have values equal to each other on the positive side and on the negative side, e.g., 30°. At the phase of 30°, the DC exciting current Idv becomes zero, and DC exciting currents Idu and Idw have values equal to each other on the positive side and on the negative side. The pathways along which the DC exciting currents Idu and Idw flow are shown in FIG. 1 by broken line arrows.

The DC exciting current Idu flows, by turning on of the upper side IGBT 21 of the inverter 20 and turning on of the lower side IGBT 32 of the inverter 33, from the positive side output end (+) of the DC power source apparatus 10 to one end of the phase winding Lu through the upper aide IGBT 21 of the inverter 20, and flows from the other end of the phase winding Lu to the negative side output end (−) of the DC power source apparatus 10 through the lower side IGBT 32 of the inverter 30.

The DC exciting current Idw flows, by turning on of the upper side IGBT 33 of the inverter 30 and turning on of the lower side IGBT 26 of the inverter 20, from the positive side output end (+) of the DC power source apparatus 10 to the other end of: the phase winding Lw through the upper side IGBT 33 of the inverter 30, and flows from one end of the phase winding Lw to the negative side output end (−) of the DC power source apparatus 10 through the lower side-IGBT 26 of the inverter 20.

The DC exciting current Idv becomes zero and DC exciting currents Idu and Idw are balanced with each other owing to their values equal to each other on the positive side and on the negative side, and hence the zero-axis current Iz flowing from the negative output end (−) of the DC power source apparatus 10 toward each of the phase windings Lu, Lv, and Lw through the inverters 20 and 30 becomes zero. The zero-axis current Iz becomes zero, and hence the motor loss at the time of DC excitation can be reduced.

Figure 5:
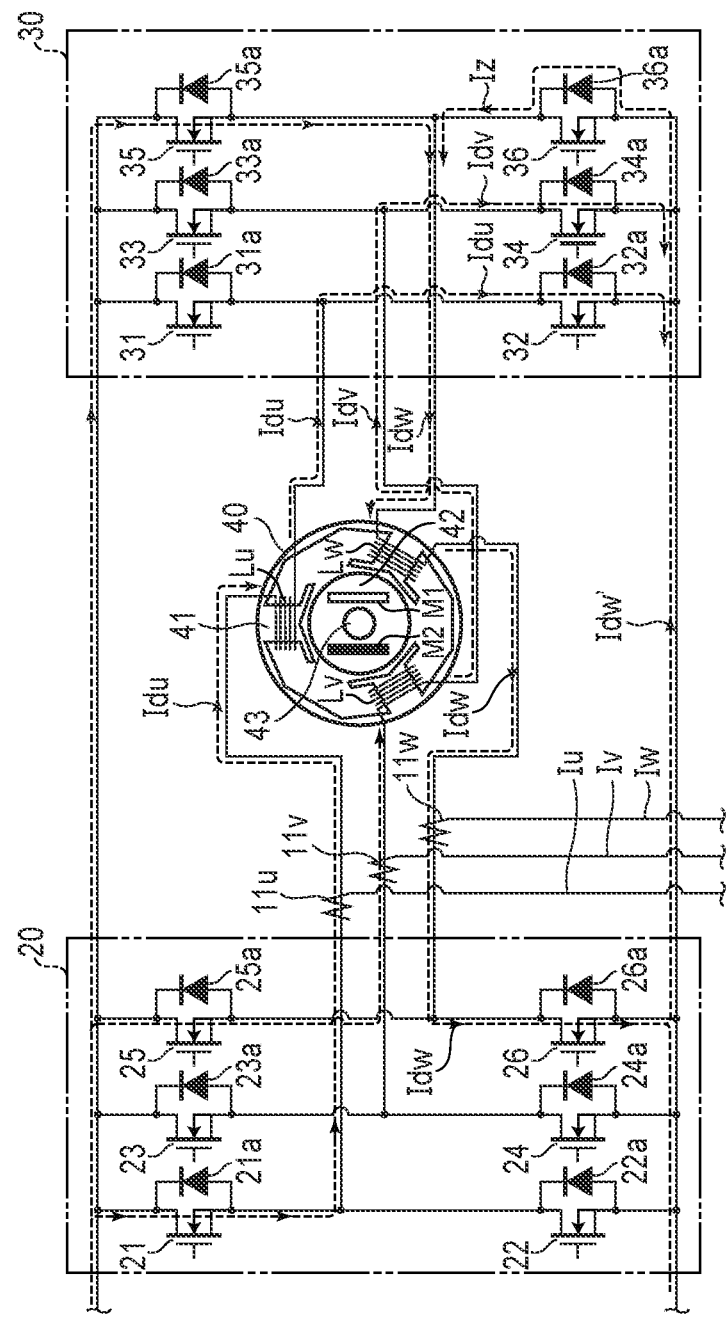
FIG. 5 is a view showing pathways of currents made to flow by the DC excitation of FIG. 4.

Supposing that DC excitation is carried out at the phase 45° as shown in FIG. 4, the DC exciting current Idv comes to have a value deviating from zero to the positive side, and DC exciting currents Idu and Idw come to have values different from each other on the positive side and on the negative side. The pathways along which these DC exciting currents Idu, Idv, and Idw flow are shown in FIG. 5 by broken line arrows.

The DC exciting current Idu flows, by turning on of the upper side IGBT 21 of the inverter 20 and turning on of the lower side IGBT 32 of the inverter 30, from the positive side output end (+) of the DC power source 10 to one end of the phase winding Lu through the upper side IGBT 21 of the inverter 20, and flows from the other end of the phase winding Lu to the negative side output end (−) of the EC power source apparatus 10 through the lower side IGBT 32 of the inverter 30.

The DC exciting current Idv flows, by turning on of the upper side IGBT 25 of the inverter 20 and turning on of the lower side IGBT 34 of the inverter 30, from the positive output end (+) of the DC power source apparatus 10 to one end of the phase winding Lv through the upper IGBT 25 of the inverter 20, and flows from the other end of the phase winding Lv to the negative side output end (−) of the DC power source 10 through the lower side IGBT 34 of the inverter 30.

The DC exciting current Idw flows, by turning on of the upper side IGBT 35 of the inverter 30 and turning on of the lower side IGBT 26 of the inverter 23, from the positive side output end (+) of the DC power source apparatus 10 to the other end of the phase winding Lw through the upper side IGBT 35 of the inverter 30, and flows from one end of the phase winding Lw to the negative side output end (−) of the PC power source apparatus 10 through the lower side IGBT 26 of the inverter 20. Further, part of the amount of the DC exciting current Idw passing through the switch element 26, i.e., an amount of a current Idw' greater than the compound amount of the DC exciting currents Idu and Idv constitutes the zero-axis current Iz flowing toward the phase winding Lw through the regeneration diode 36a of the lower side IGBT 36 of the inverter 30. In the case of such electrification, the zero-axis current Iz becomes significant, and thus the motor loss increases. In this embodiment, it is possible to resolve such a problem.

It should be noted that regarding the phase currents Iu, Iv, and Iw, the phase at which one phase current becomes zero and the remaining two phase currents have values approximately equal to each other-on the positive side and on the negative side is not limited to 30°, and is 90°, 150°, 210°, 270° or 330°. At the phase of 90°, the DC exciting current Idu becomes zero, and DC exciting currents Idv and Idw are balanced with each other owing to their values approximately equal to each other on the positive side and on the negative side. At the phase of 150°, the DC exciting current Idw becomes zero, and DC exciting currents Idv and Idu are balanced with each other owing to their values equal to each other on the positive side and on the negative side. It is sufficient it DC excitation is carried out at any one of these phases of 30°, 90°, 150°, 210°, 270°, and 330°.

It should be noted that the motor loss is proportionate to the magnitude of the zero-axis current. Further, the zero-axis current changes approximately in the sinusoidal form at a frequency three times the motor drive frequency based on the normal sinusoidal wave. For this reason, although in the state where the zero-axis current is zero, the efficiency becomes the highest, even when electrification is carried cut in the vicinity of a phase at which the zero-axis current becomes zero, it is possible to sufficiently improve the motor efficiency. Accordingly, ever, without making the zero-axis current completely zero, by making the motor carry out a PWM-controlled output operation at a phase in the vicinity of, or for example, within a range of ±5° of 30°, 90°, 150°, 210°, 270° or 330°, it is possible to improve the efficiency of the motor. Regarding electrification at each of the phases described above, the DC exciting current Idu becomes approximately zero, DC exciting currents Idv and Idw come to have values on the positive side and on the negative side approximately equal to each other and, although the zero-axis current Iz slightly occurs, the value thereof is so small that the loss is also small and the efficiency of the motor is not lowered sc much.

While certain embodiments have been described/these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A motor drive apparatus which drives a motor including a plurality of phase windings arranged in a mutually unconnected state comprising:
   a first inverter which controls electrification to one end of each of the phase windings;
   a second inverter which controls electrification to the other end of each of the phase windings; and
   a controller which, at the time of startup of the motor, rotationally moves a rotor of the motor to an initial position by DC excitation of supplying DC exciting currents from the first and second inverters to the phase windings and, after this rotational movement, PWM-controls switching of the first and second inverters in such a manner that a rotational speed of the rotor becomes the target rotational speed, wherein
   the controller carries out the DC excitation by which a zero-axis current in each of the phase windings becomes approximately zero.

2. The motor drive apparatus of claim 1, wherein
   DC exciting currents are a plurality of DC exciting currents corresponding to, among combinations of phase currents made to flow through the phase windings by the PWM control, the phase currents of a phase at which the zero-axis currents in each of the phase windings becomes zero.

3. The motor drive apparatus of claim 1, wherein
   the DC exciting current corresponds to, among combinations of phase currents flowing through the phase windings, phase currents of a phase at which one of phase currents becomes zero and remaining phase currents come to possess values approximately equivalent to each other on the positive side and on the negative side.

4. The motor drive apparatus of claim 3, wherein
   the phase windings are three phase windings, and
   the DC exciting currents are three DC exciting currents corresponding to, among combinations of three phase currents made to flow through the phase windings by the PWM control, three phase currents of a phase at which one phase current becomes zero and remaining two phase currents come to possess values approximately equal to each other on the positive side and on the negative side.

5. The motor drive apparatus of claim 1, wherein
   the phase windings are three phase windings, and
   the controller controls switching of the first inverter and the second inverter in such a manner that no DC exciting current flows through one phase winding of the three phase windings, a DC exciting current in one direction flows through another phase winding, and a DC exciting current in the other direction flows through a remaining one phase winding.

6. The motor drive apparatus of claim 4, wherein
   the phase at which the one phase current becomes zero and the remaining two phase currents come to possess values approximately equal to each other on the positive side and on the negative side is 30°, 30°, 150°, 210°, 270° or 330°.

7. The motor drive apparatus of claim 1, wherein
   the controller
   rotationally moves, at the time of startup of the motor, the rotor of the motor to the initial position by the DC excitation of supplying DC exciting currents from the first and second inverters to the phase windings, and after this rotational, movement, completes the startup of the motor by rotating the rotor by forced commutation of supplying field-component currents from the first and second inverters to the phase windings, and
   after the completion of the startup, detects a rotational speed of the rotor on the basis of the phase currents flowing through the phase windings, and PWM-controls switching of the first and second inverters in such a manner that the detected rotational speed becomes the target rotational speed.

\* \* \* \* \*